United States Patent [19]

Panigati

[11] Patent Number: 4,466,624
[45] Date of Patent: Aug. 21, 1984

[54] SEALING ARRANGEMENT

[75] Inventor: Pier L. Panigati, Lugano, Switzerland

[73] Assignee: Etablissement d'Occident, Vaduz, Liechtenstein

[21] Appl. No.: 147,238

[22] Filed: May 6, 1980

Related U.S. Application Data

[63] Continuation of Ser. No. 917,884, Jun. 22, 1978, abandoned.

[30] Foreign Application Priority Data

Jun. 27, 1977 [CH] Switzerland ............... 7861/77

[51] Int. Cl.³ .................... F16J 15/32; F16J 5/40
[52] U.S. Cl. .................... 277/171; 277/27
[58] Field of Search ............ 277/3, 27, 170, 171, 277/94

[56] References Cited

U.S. PATENT DOCUMENTS

| | | | |
|---|---|---|---|
| 2,368,744 | 2/1945 | Carey | 277/171 |
| 2,936,715 | 5/1960 | Southam | 277/94 |
| 3,347,555 | 10/1967 | Norton | 277/171 |
| 3,895,815 | 7/1975 | Panigati | 277/191 |

Primary Examiner—Robert I. Smith
Attorney, Agent, or Firm—Roylance, Abrams, Berdo & Goodman

[57] ABSTRACT

The disclosed arrangement is for sealing between two cylindrical bodies with an annular gasket ring in such a way that the seal is established only under conditions of a predetermined fluid pressure, so that at a lower pressure a flow is permitted across the seal. The ring in its relaxed state has a clearance spacing from the sealing surfaces. It has a radial cross-sectional configuration such that when there is fluid pressure against the ring from one side, it deforms outwardly to provide the necessary sealing force against the sealing surfaces. The radial cross-section of the ring has a first portion extending along the sealing surface of the outer body and at least one further portion extending in substantially radial manner from the first portion. The deformation takes place by a radial cross-sectional rotation about a torsional axis which is located in the first part of the ring. Various ring and seat configurations are described.

6 Claims, 7 Drawing Figures

SEALING ARRANGEMENT

This application is a continuation application of U.S. Ser. No. 917,884 filed June 22, 1978, and now abandoned.

BACKGROUND OF THE INVENTION

The invention relates to a sealing arrangement between two cylindrical bodies which can be moved relative to one another. One body has a seat for receiving a sealing ring made of elastic material and which, with the two bodies in a state of rest, has a given clearance with respect to the sealing surface of the other body. At least one side of the ring forms an angle with the corresponding side of the seat in order to permit the sealing ring, under the action of the pressure of a fluid penetrating the free space between the two bodies on one side of the seat, to rotate about its torsional axis and thereby engage against one of the two sides of the seat which serve as sealing surfaces.

Arrangements of this general type are already known. For example, in Swiss Pat. No. 560,340 there is disclosed an arrangement in which an annular seal has a V-shaped cross-section along its periphery, while the ring gasket has a cross-section substantially formed by sides which converge towards the base of the seat. In this known arrangement, the opening angle of the seat is larger than the angle of the two sides of the gasket ring which converge from the contact surface of the gasket ring facing the sealing surface of the other body towards the tip thereof on the bottom of the slot-like seat. Thus, the spacing between the two sides of the seat measured at a certain radial distance from the longitudinal central axis of the cylindrical body and the gasket ring is always greater than the corresponding spacing between the sides of the gasket ring. If necessary, the gasket ring can be in contact in the rest state with the sealing surface of the other body with which it must perform its sealing function or must be at a limited distance from that sealing surface. Furthermore, the gasket ring must rest without any pressure on the base of the annular seat, because it would otherwise be in an unstable state of equilibrium and, due to the pressure, would be drawn against one or the other side of the seat instead of being positioned symmetrically to the seat as is in the present case. If a pressurized fluid now enters the free space formed by one side of the seat and the corresponding side of the gasket ring, forces are exerted on the gasket ring which result in a torque distributed over the annular torsional axis of the gasket ring. In practice, the pressurized fluid moves the gasket ring by a unit by an amount dependent upon the existing clearance until the tips of the lower lips, with which the gasket ring is supported on the base of the seat, come into contact with the corresponding side of the annular seat. This contact produces a reaction by the seat side on the gasket ring which leads to a rotation of the ring about its torsional axis to cause one or other of the outer tips of the gasket ring to rise, i.e. to increase its radial spacing. This lift or increase of spacing then brings about contact with the sealing surface of the facing body, accompanied by a corresponding sealing action.

SUMMARY OF THE INVENTION

In an improved sealing arrangement of the above-indicated type, there is provided a novel gasket ring having a cross-section formed from a first portion extending along the sealing surface of the other body and at least one further portion extending in substantially radial manner from the first portion. The point at which the torsional axis passes vertically through the cross-section is located in the first portion.

DETAILED DESCRIPTION OF THE PREFERRED EMBODIMENTS

Figure 1:
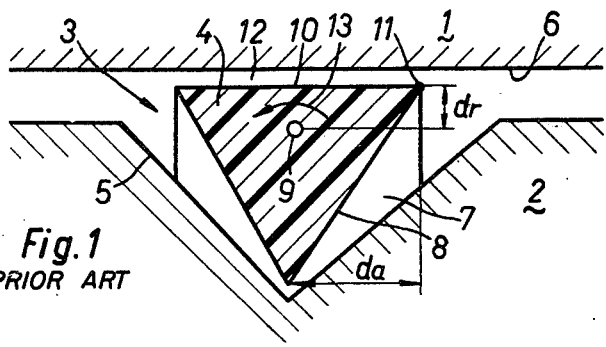
FIG. 1 is a diagrammatic cross-section through a prior art sealing arrangement for the purpose of illustrating certain fundamental aspects of seals of the general type to which the present invention pertains.

FIG. 1 diagrammetically shows one portion in cross-section of a seal between two bodies which move relative to one another. In particular, the bodies are a cylinder 1 and a piston 2. In general, the relative movement is brought about by a displacement of piston 2 due to the pressure of a fluid which acts on one of its two ends. To ensure that this cylinder piston unit does in fact function, it is important that the fluid cannot reach the opposite end of piston 2. This is prevented by a seal 3 having a gasket ring 4 located, for example, in an annular slot of piston 2 which serves as the seat for the gasket ring. In the operating state the gasket ring 4 engages with the sealing surface 6 of cylinder 1 during the displacement.

If a pressurized fluid is introduced, the latter enters space 7 formed between side 8 of gasket ring 4 and the side of seat 5, so that it exerts forces on the gasket ring which in turn trigger off reactions resulting in a torque which is distributed along the annular axis 9 (torsional axis) of the ring. It can be seen from the cross-section of the gasket ring that the side 10 of gasket ring 4, which is substantially parallel to sealing surface 6, will become inclined, so that individual points on this line located at the end thereof are raised. Finally, one of these points, for example point 11, will come into contact with sealing surface 6, so that the desired sealing action is brought about.

To reduce static friction between gasket ring 4 and sealing surface 6, a given clearance 12 is provided which, as a function of the unavoidable manufacturing tolerances, can be reduced to the value 0. To avoid this possibility, it is necessary to provide a clearance with a larger nominal value. In the case of an unfavourable summation of the tolerances, this can then lead to an excessive clearance, because the minimum fluid pressure necessary for rotating the gasket ring into a sealing position is then too high to be permissible for the satisfactory operation of the arrangement.

Thus, the limitations of the known prior art arrangement are that it is impossible to freely establish the clearance between gasket ring and sealing surface and to simultaneously maintain within desirable limits the minimum pressure necessary for the sealing action. This will be explained in greater detail hereinafter.

As already stated, the gasket ring rotates about its torsional axis 9 due to the resultant of the forces acting thereon. Thus, the position of this axis, which is determined by the cross-sectional shape of gasket ring 4 and its diameter, influences either all the elastic reactions of the gasket ring relative to the torsional rotation or the total raising of the uppermost points of the gasket ring, such as point 11, which finally brings about the sealing action.

The maximum raising of the sealing points with the minimum rotation angle of the gasket ring is obtained if the torsional axis 9 has the minimum radial spacing and the maximum axial spacing from these points.

In FIG. 1, this means that the axial spacing $d_a$ of torsional axis 9 for example of point 11, which is most remote therefrom, must be as large as possible in order to bring about the maximum raising of this point during the rotation in accordance with arrow 13, while the radial spacing $d_r$ between the torsional axis and that point must be kept as small as possible.

However, simultaneously with the increase in the axial spacing there is a rise in the elastic torsional resistance of the gasket ring. As a result of the optimization of these opposing requirements, the maximum raising of the sealing point with a minimum rotation is obtained at a minimum pressure of the fluid involved.

Thus, the presence of a certain clearance between gasket ring 4 and body 1 leads to a minimum pressure on one side 8 of the gasket ring (or a minimum pressure difference, if both sides are under pressure) in order to bring about the sealing action. With the triangular shape of the gasket ring of FIG. 1, the possibility of maintaining a minimum pressure in the presence of a favorable clearance 2 is extremely limited. It is in fact possible to modify the shape and dimensions of the triangle. To bring the torsional axis closer to the sealing surface and to move the sealing points of the gasket ring further away from the axis, the base of the triangle can be enlarged, accompanied by the simultaneous reduction of its height. Or, other triangular shapes can be selected. However, all these measures call for complicated calculations, because the best result is obtained from an optimization of opposing effects, even if it is in fact obtained. The raising of the torional axis with a corresponding widening of the base of the triangle, for example, brings about an increase in the elastic torsional resistance.

With a seal in accordance with the present invention, however, the movement tolerance for maintaining the maximum sealing pressure is significantly larger, as can be gathered from FIGS. 2 to 6, which represent various embodiments of a seal according to the present invention.

Figure 2:
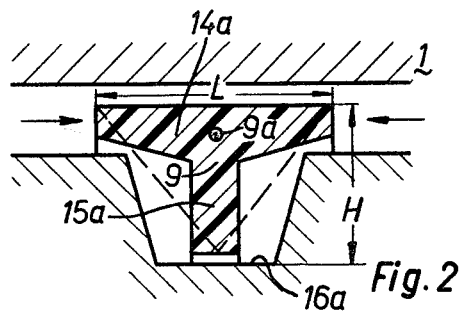
FIGS. 2 to 7 are radial cross-sectional views of a fragment of various preferred embodiments of novel seat and gasket ring sealing arrangements according to the present invention, with the gasket ring shown in a relaxed position.

FIG. 2 shows a gasket ring 4 which is essentially T-shaped and is partly located in seat 5. The gasket ring has an axial main portion or leg 14a located in the space between the two bodies 1 and 2 and which extends over the opening of seat 5 and also has a further leg portion 15a which passes directly in a radial direction towards the base 16a of seat 5. On considering this construction superimposed on that of FIG. 1, as shown by broken lines in FIG. 2, it can be seen that with the same length L and same height H the torsional axis 9a is radially further from the bottom of the seat or from the longitudinal axis of the arrangement than the torsional axis 9. Thus, for the same rotation angle, point 11 is raised to a greater extent. At the same time, the T-shaped gasket ring offers a smaller elastic resistance to rotation, due to its relatively large material concentration about the axis of symmetry.

Figure 3:
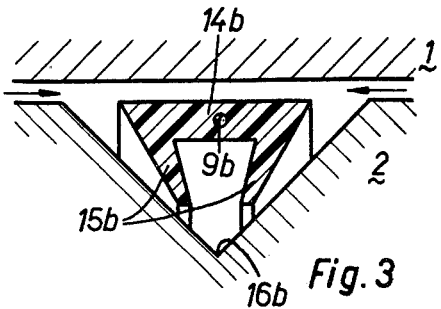

The same can be said of the gasket ring of FIG. 3. This ring is substantially U-shaped, has two lips or legs 15b located at the ends of main portion 14b and which extend towards the base 16b of the triangular seat while having a decreasing width. Through removing material from the original triangular shape in the lower part of the cross-sectional configuration, in the same way as in FIG. 2, the torsional axis 9b is higher than the axis 9 of the triangular shape according to FIG. 1. Thus, for the same rotation angle, point 11 is once again raised to a greater extent. Simultaneously, the internal material reduction leads to a reduction of the elastic resistance, and consequently a low operating pressure.

Figure 4:
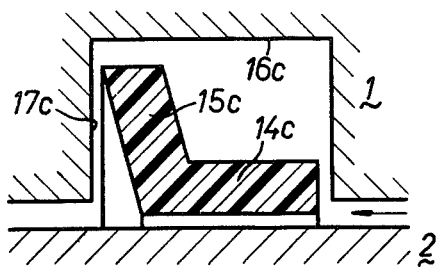
Figure 5:
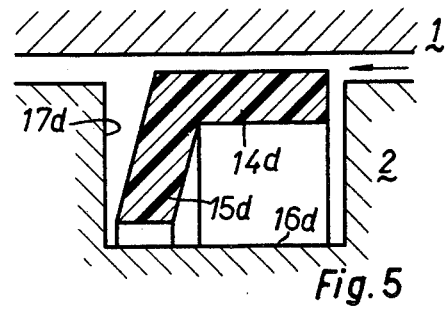

In the same way, the gaket ring configurations according to FIGS. 4 and 5 are very advantageous, sealing taking place on the inside of the ring. Both sealing arrangements only act in one direction, i.e. the fluid enters from one side and sealing takes place on the other side. Details of these two embodiments will be described hereinafter.

Reference is once again made hereto the usefulness of the represented gasket ring which, relative to the sealing surface, has a clearance which can be predetermined with a high degree of freedom.

It has already been stated that this clearance can reduce the static friction to 0. This is the case with sealing parts which are movable relative to one another, such as for example fluid-dynamic cylinders, coils in pressure valves, and the like. In all these cases the clearance can be predetermined if it is desired to use the gasket ring not only as a sealing member, but also as a fluid control member.

The embodiments of the gasket ring according to FIGS. 4 and 5 have a substantially L-shape and are mounted in rectangular seats 5. The main portion 14c of FIG. 4 or 14d of FIB. 5, as in all embodiments, extends in the axial direction of the arrangement, while the other portion 15c of FIG. 4 or 15d of FIG. 5, extending towards the base 16c of FIG. 4 or 16d of FIG. 5, is inclined towards the radial side 17c of FIG. 4 or 17d of FIG. 5 of the seat and thus forms an angle with the latter. With these variants, a sealing action occurs only in one flow direction of the hydraulic fluid, while in the opposite direction the latter can flow through. It is obviously desirable under such conditions that the passage is as large as possible, so that the clearance between gasket ring 4 and sealing surface 6 assumes the maximum value which is acceptable with the opposing requirements of absolute sealing in the case of flow in the opposite direction, so that the flow pressure must be as low as possible. As stated hereinbefore, the present invention permits the best possible optimization of all these requirements.

Figure 6:
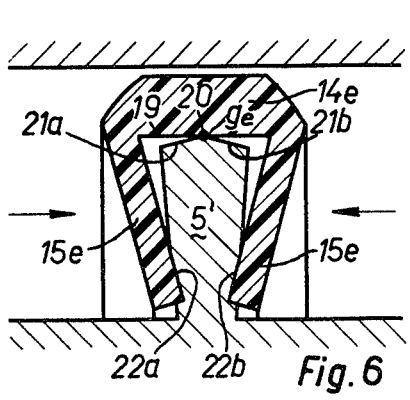
Figure 7:
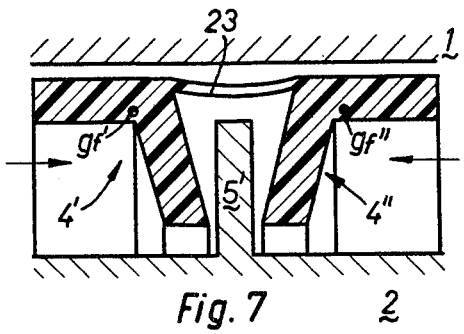

Further variants can be gathered from FIGS. 6 and 7, in which the slot, which previously formed the seat, is replaced by a seat 5' in the form of an annular projection which forms an angle with each of the inner sides of the seal, wherein the same has a substantially U-shaped configuration. Thus, when pressure acts on one or other side of the seal, these angles permit a rotation thereof to consequently permit the desired sealing action takes place.

In the embodiment of FIG. 6, the gasket ring is supported by means of the lower side 19 of its main portion 14e on an edge 20 on the peripheral surface of projection 5', wherein the surface is subdivided into two parts 21a, 21b, which in each case form an angle with the side 19 of the gasket ring. If the contact point between the side and the edge coincides with the torsional axis 9e, which is in part dependent on the selected dimensions for the main portion 14e and for the other portions 15e, the best operation of this embodiment is obtained.

At their lower ends, the two parts 15e are partly mounted in depressions 22a, 22b, so as to permit a stable equilibrium when the gasket ring is in the relaxed position.

Projection 5' in FIG. 7 has a rectangular configuration, and the gasket ring comprises two halves 4', 4", which are in cross-section identical with the embodiments of FIGS. 4 and 5. The two halves are interconnected by means of a soft annular membrane 23 over and beyond the projection 5'. Membrane 23 must be soft in order to permit the rotation of one or other half 4', 4" without this movement being transmitted to the other half. Both halves can also rotate simultaneously and then be in simultaneous contact with the corresponding sealing surface, even in the presence of two identical pressures. None of the previously considered embodiments is able to rotate, and consequently seal under such conditions.

For all the represented embodiments, the position, particularly the raising, of torsional axis 9 can be selected through using a different material for main portion 14 and parts 15. In particular, portion 14 can be made from a material with a much higher specific gravity than that for parts 15.

I claim:

1. In a sealing arrangement for providing a fluid seal beween first and second spaced apart, relatively movable and generally cylindrical bodies, the arrangement being of the type wherein the first of said bodies is provided with a seat having first and second generally radially extending, axially spaced seating surfaces, the arrangement including an annular gasket ring of resilient material having, in its relaxed condition, a predetermined clearance from the second body and annular clearances between the ring and the seating surfaces, said ring having an annular torsinal axis about which the ring can rotate under the pressure influence of fluid passing between the bodies to engage and form a seal with one of the seating surfaces, the improvement wherein said seating surfaces define a groove dimensioned to loosely receive said gasket ring so that said ring is free to move relative to said bodies, said gasket ring being formed such that, in cross section, the ring comprises an axial portion including a first leg extending axially along said second body and spaced therefrom in the relaxed condition outside of said groove; and a radial portion including at least one second leg attached to and extending generally linearly radially from said the first leg toward the bottom of said groove in said first body such that said torsional axis is contained in said axial portion with most of said second leg in said groove, and wherein said sealing ring is movable relative to both of said first and second bodies.

2. The arrangement of claim 1 and wherein the seat is a groove having a triangular radial cross-sectional configuration, and said radial portion of the gasket ring has two axially spaced second legs located at the axial ends of said first leg, the axial thickness of said second legs decreasing as they approach the bottom of the groove.

3. The arrangement of claim 1 and wherein the seat is a groove having a rectangular radial cross-sectional configuration with radial sides, and the gasket ring is substantially L-shaped, and wherein said second leg of the cross-section extending towards the bottom of the groove is inclined relative to the sides of the groove.

4. The arrangement of claim 1 and wherein said seat is an annular projection on the surface of the first body, the peripheral surface of the seat having an edge, and the side surfaces thereof having annular depressions;

said gasket ring has a U-shaped radial cross-sectional configuration and rests symmetrically on said edge of the seat in order to form an angle with each of the contiguous sides;

and wherein the distal edges of each radial legs of the gasket ring are partly mounted in said annular depressions of the seat projection.

5. The arrangement of claim 1 and wherein the seat is an annular projection of rectangular radial cross-sectional configuration on the surface of the first body, the radial cross-sectional configuration of the gasket ring comprises two halves, one of the halves having a L-shape, said one half being located on one side of the seat projection, and being connected with the other half by means of an annular membrane which is sufficiently soft to permit the individual rotation of each half of the sealing ring about its own torsional axis.

6. The arrangement of claim 1 and wherein said first leg of the gasket ring is made of a material whose specific gravity is higher than the material of which the remaining part of the gasket ring is made.

* * * * *